(12) United States Patent
Marshall

(10) Patent No.: US 11,436,899 B2
(45) Date of Patent: Sep. 6, 2022

(54) SYSTEM AND METHOD FOR VISUALIZING A CARBON FOOTPRINT

(71) Applicant: Carbon Reveal, LLC, Germantown, MD (US)

(72) Inventor: Robert Marshall, Ijamsville, MD (US)

(\*) Notice: Subject to any disclaimer, the term of this patent is extended or adjusted under 35 U.S.C. 154(b) by 889 days.

(21) Appl. No.: 16/265,842

(22) Filed: Feb. 1, 2019

(65) Prior Publication Data

US 2019/0236915 A1 Aug. 1, 2019

Related U.S. Application Data

(60) Provisional application No. 62/625,246, filed on Feb. 1, 2018.

(51) Int. Cl.
*G08B 5/40* (2006.01)
*G05B 19/406* (2006.01)

(52) U.S. Cl.
CPC ............ *G08B 5/40* (2013.01); *G05B 19/406* (2013.01); *G05B 2219/34351* (2013.01)

(58) Field of Classification Search
CPC ................ G08B 5/40; G05B 19/406; G05B 2219/34351; Y02P 90/84; G06Q 10/10
See application file for complete search history.

(56) References Cited

U.S. PATENT DOCUMENTS

2011/0213690 A1\* 9/2011 Ghosh ................ G06Q 40/04
705/317

\* cited by examiner

*Primary Examiner* — Joseph H Feild
*Assistant Examiner* — Sharmin Akhter
(74) *Attorney, Agent, or Firm* — Proskauer Rose LLP

(57) ABSTRACT

Described herein are methods and systems for visualization of a carbon footprint for one or more real-world objects or events. A server computing device identifies a carbon footprint value for at least one real-world object or event. The server computing device determines an amount of greenhouse gas that corresponds to the carbon footprint value. The server computing device generates instructions for operation of a gas visualization device coupled to the server computing device based upon the amount of greenhouse gas. The server computing device transmits the instructions to the gas visualization device. The gas visualization device executes the instructions to produce an amount of gas (i.e., fog or vapor) based upon the received instructions.

20 Claims, 2 Drawing Sheets

SYSTEM AND METHOD FOR VISUALIZING A CARBON FOOTPRINT

RELATED APPLICATIONS

This application claims priority to U.S. Provisional Patent Application No. 62/625,246, filed on Feb. 1, 2018, the entirety of which is incorporated herein by reference.

TECHNICAL FIELD

The invention relates generally to a system and method for visualization of a carbon footprint associated with one or more real-world events or objects, including apparatuses to physically project an amount of vapor or fog corresponding to an amount of carbon dioxide (or carbon dioxide equivalent (CDE)) produced by, or used in production of, the one or more real-world events or objects.

BACKGROUND

Global warming—the rise in the average temperature of the Earth's climate—is widely recognized as one of the most serious and pressing problems facing the human population. The emission of greenhouse gases, such as carbon dioxide ($CO_2$), methane, and nitrous oxide, into the atmosphere, has contributed significantly to the rapid acceleration of this warming process over the last half-century.

As scientists, governmental leaders, corporations, and community members collaborate to come up with ideas and solutions to mitigate both the short-term and long-term effects of global warming, one of the biggest obstacles has been to make the general public aware of the impact that their day-to-day behavior has with respect to the production of greenhouse gases and their emission into the atmosphere. A substantial amount of greenhouse gas is created as a result of participating in just about any activity—from driving a car to purchasing a bottle of water. However, because carbon dioxide is odorless and colorless, people cannot visualize—and therefore do not truly appreciate—the volume of gas that is produced. Unless we can really understand how our actions contribute to climate change, this critical subject will not receive the attention it deserves, which could lead to catastrophic consequences.

SUMMARY

Therefore, what is needed is a method and system that rapidly and accurately determines the carbon footprint—that is, the total set of greenhouse gas emissions caused by an individual, event organization, or product (typically expressed as CDE)—for a particular event or object, and produces an amount of visible vapor or fog that is equal to the carbon footprint, in order to enable visualization of such emissions for scientific and educational purposes.

The invention, in one aspect, features a system for visualization of a carbon footprint for one or more real-world objects or events. The system comprises a server computing device and a gas visualization device coupled to the server computing device. The server computing device identifies a carbon footprint value for at least one real-world object or event. The server computing device determines an amount of greenhouse gas that corresponds to the carbon footprint value. The server computing device generates instructions for operation of the gas visualization device based upon the amount of greenhouse gas. The server computing device transmits the instructions to the gas visualization device. The gas visualization device executes the instructions to produce an amount of gas (i.e., fog or vapor) based upon the received instructions.

The invention, in another aspect, features a computerized method of visualization of a carbon footprint for one or more real-world objects or events. A server computing device identifies a carbon footprint value for at least one real-world object or event. The server computing device determines an amount of greenhouse gas that corresponds to the carbon footprint value. The server computing device generates instructions for operation of a gas visualization device coupled to the server computing device based upon the amount of greenhouse gas. The server computing device transmits the instructions to the gas visualization device. The gas visualization device executes the instructions to produce an amount of gas (i.e., fog or vapor) based upon the received instructions.

Any of the above aspects can include one or more of the following features. In some embodiments, the instructions for operation of the gas visualization device comprise one or more settings for hardware components of the gas visualization device. In some embodiments, the one or more settings for hardware components of the gas visualization device comprise an aperture size for a gas emission port on the gas visualization device. In some embodiments, the one or more settings for hardware components of the gas visualization device comprise a gas volume output value for a pump housed in the gas visualization device. In some embodiments, the one or more settings for hardware components of the gas visualization device comprise a start time and an end time for activation of a timer in the gas visualization device that controls gas output.

In some embodiments, identifying a carbon footprint value for at least one real-world object or event comprises: determining one or more data values associated with the at least one real-world object or event; and converting the one or more data values associated with the at least one real-world object or event into the carbon footprint value using a predetermined algorithm. In some embodiments, the carbon footprint value comprises a mass of CO2. In some embodiments, the amount of greenhouse gas that corresponds to the carbon footprint value is expressed as a volume of greenhouse gas. In some embodiments, determining an amount of greenhouse gas that corresponds to the carbon footprint value comprises: identifying one or more constants associated with conversion of the carbon footprint value into the volume of greenhouse gas; and converting the carbon footprint value into the volume of greenhouse gas using the one or more constants. In some embodiments, the one or more constants comprise a volume of one pound of pure $CO_2$ at standard temperature and pressure (STP), an amount of $CO_2$ emissions per gallon of gasoline, a current atmospheric $CO_2$ concentration, a $CO_2$ concentration used for carbon footprint calculations, a factor of pure $CO_2$ at 1,000,000 parts per minute (ppm), a residential electricity $CO_2$ emission rate, a residential electricity utility rate, and a gas visualization device max output level.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
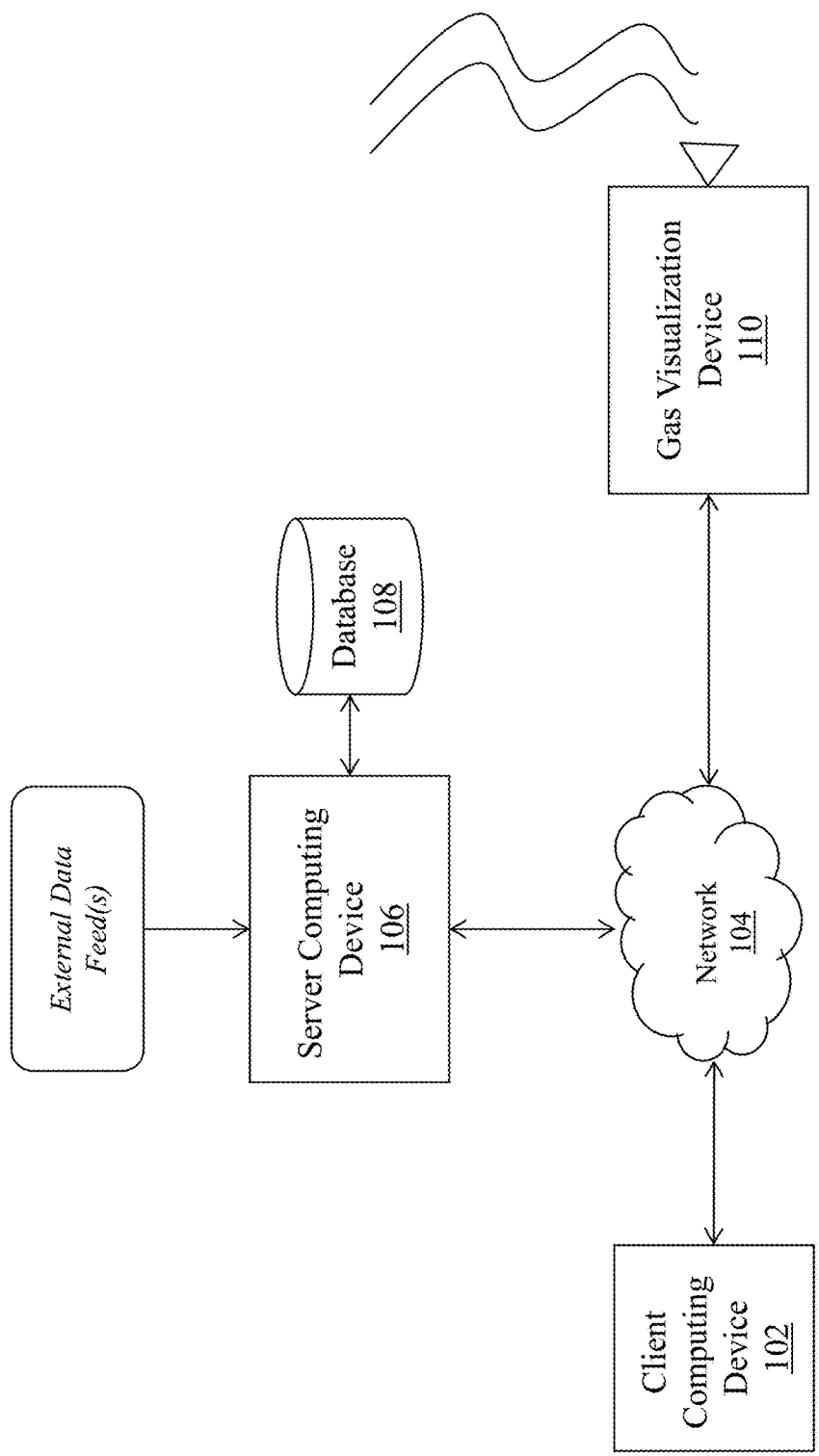
FIG. 1 is a block diagram of a system for visualization of a carbon footprint for one or more real-world objects or events.

FIG. 1 is a block diagram of a system 100 for visualization of a carbon footprint for one or more real-world objects or events. The system 100 includes a client computing device 102, a communications network 104, a server computing device 106 that includes a greenhouse gas determination module 106a, a database 108, and a gas visualization device 110.

The client computing device 102 connects to the local communications network 104 in order to communicate with the server computing device 106, and the greenhouse gas determination module 106a, to provide input and receive output (e.g., network packets) relating to the process of visualization of a carbon footprint for one or more real-world objects or events, as described herein. Exemplary client computing devices 102 include, but are not limited to, desktop computers, laptop computers, tablets, smartphones, smart watches, and IoT devices. It should be appreciated that other types of computing devices that are capable of connecting to the components of the system 100 can be used without departing from the scope of invention. Although FIG. 1 depicts a single client device 102, it should be appreciated that the system 100 can include any number of client computing devices.

The communication network 104 enables the client computing device 102 of the system 100 to communicate with the server computing device 106, and the server computing device 106 to communicate with the gas visualization device 110, in relation to the process of visualization of a carbon footprint for one or more real-world objects or events, as described herein. In some embodiments, the network 104 is comprised of several discrete networks and/or sub-networks that enable the client computing device 102, the server computing device 106, and the gas visualization device 110 to communicate. It should be appreciated that in some embodiments, the client computing device 102 can communicate directly with the gas visualization device 110.

The server computing device 106 is a combination of hardware, including one or more special-purpose processors and one or more physical memory modules, and specialized software modules that are executed by a processor of the server 106, to receive data from other components of the system 100, transmit data to other components of the system 100, and perform functions for visualization of a carbon footprint for one or more real-world objects or events, as described herein. In some embodiments, the greenhouse gas determination module 106a and other software modules of the server 106 are specialized sets of computer software instructions programmed onto a dedicated processor in the server 106 and can include specifically-designated memory locations and/or registers for executing the specialized computer software instructions.

Although the greenhouse gas module 106a is shown in FIG. 1 as executing within a single server computing device 106, in some embodiments the functionality of the module 106a can be distributed among a plurality of server computing devices. It should be appreciated that any number of computing devices, arranged in a variety of architectures, resources, and configurations (e.g., cluster computing, virtual computing, cloud computing) can be used without departing from the scope of the invention. The exemplary functionality of the greenhouse gas module 106a is described in detail below.

The database 108 comprises transient and/or persistent memory for data storage that is used in conjunction with the process for visualization of a carbon footprint for one or more real-world objects or events, as described herein. Generally, the database 108 is configured to receive, generate, and store specific segments of data for use by the greenhouse gas determination module 106a and the server computing device 106. In some embodiments, all or a portion of the database 108 can be integrated within the server 106, or be located on a separate computing device or devices. For example, the database 108 can comprise a database such as MySQL™ available from Oracle Corp. of Redwood City, Calif.

The greenhouse gas visualization device 110 is a hardware device that is configured to generate and emit a visible vapor or fog that corresponds to an amount of greenhouse gas in the carbon footprint of a real-world object or event. In one embodiment, the greenhouse gas visualization device 110 is a fog machine, that includes components such as an inert gas or an electric pump to propel a liquid solution into a heat exchanger, where the solution is vaporized to emit a white or colored fog into the surrounding air (e.g., via a port on the device). It should be appreciated that other configurations or devices that are capable of emitting gas or vapor in a controlled manner can be used within the scope of invention. The greenhouse gas visualization device 110 also includes network interface components to enable the machine to communicate with the server computing device 106, via either a wired or wireless connection. In one embodiment, the greenhouse gas visualization device 110 includes a processor and/or control board that is configured to receive commands or instructions from the server computing device 106, that activate the emission apparatus housed in the device 110 to emit a volume of gas/vapor (e.g., by generating the gas internally and releasing the gas via the port) over a certain time period. In some embodiments, the commands can instruct the device 110 to continuously generate gas and leave the port open during a certain time period. In some embodiments, the commands can instruct the device 110 to generate and emit gas at specific amounts and during specific intervals during a certain time period.

Figure 2:
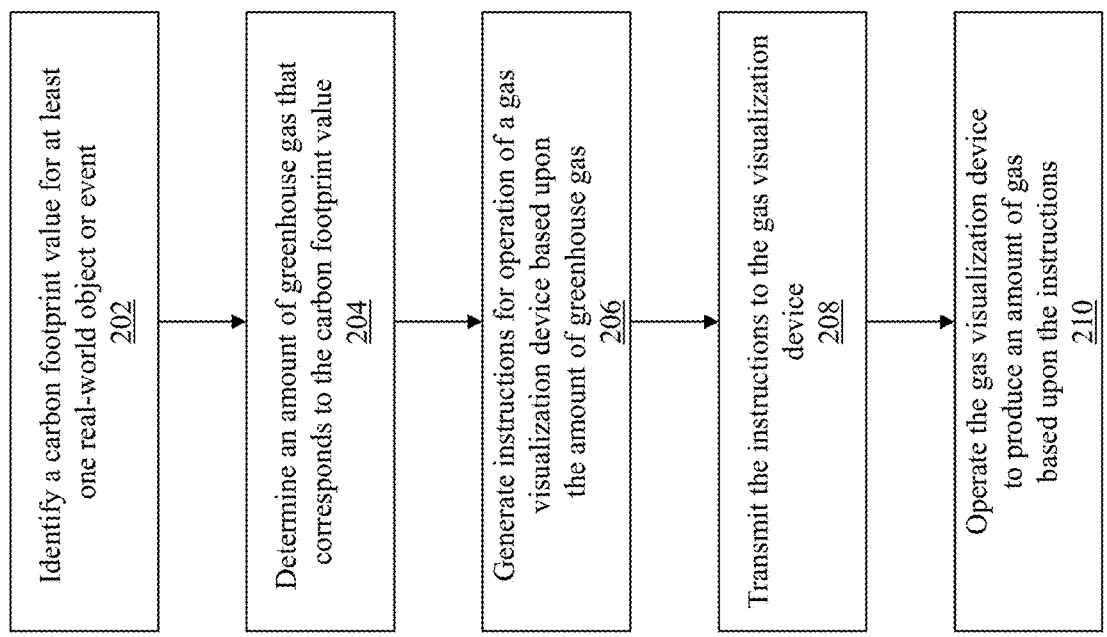
FIG. 2 is a flow diagram of a method of visualization of a carbon footprint for one or more real-world objects or events.

FIG. 2 is a flow diagram of a method 200 of visualization of a carbon footprint for one or more real-world objects or events, using the system 100 of FIG. 1. The greenhouse gas determination module 106a identifies (202) a carbon footprint value for at least one real-world object or event. In one example, a user at client computing device 102 can provide input (e.g., a selection on a GUI) for the at least one-real-world object or event that is transmitted to the module 106a at server computing device 106. Some examples of real-world objects or events that are capable of being analyzed by the system 100 include, but are not limited to, use of automobiles and other vehicles, production of consumer goods and related packaging, use of energy in buildings, and the like. It should be appreciated that almost any man-made object or human activity that produces emissions in some form can be used as input to the system 100.

In some embodiments, the module 106a retrieves one or more data values that are then used by the module 106a to arrive at a corresponding carbon footprint value. For example, in the case of an automobile, the module 106a can retrieve an automobile mile per gallon rating, a number of miles traveled, and a speed of the automobile—then determine a mass of $CO_2$ in lbs. that corresponds to the activity of the automobile; the mass of $CO_2$ is used as the carbon footprint value. In the case of home energy, the module 106a can retrieve a number of kilowatt hours used by a building, then convert the number of hours into a mass of $CO_2$ in lbs., which is used as the carbon footprint value. In the case of manufacturing a case of water bottles, the module 106a can retrieve a number of ounces of $CO_2$ used to produce one water bottle, then convert that value into a mass of $CO_2$ in lbs., which is used as the carbon footprint value. The greenhouse gas determination module 106a can retrieve the carbon footprint value from, e.g., database 108 which can store carbon footprint values for a large number of different objects and/or events. In another example, the greenhouse gas determination module 106a can obtain the carbon footprint value from an external data source (e.g., governmental data feeds) via an API or file transfer.

After identifying the carbon footprint value, the greenhouse gas determination module 106a determines (204) an amount of greenhouse gas that corresponds to the carbon footprint value. The module 106a performs a series of calculations to convert the carbon footprint value into an amount of greenhouse gas. Generally, the amount of greenhouse gas is expressed as a volume (e.g., cu. ft.)—but it should be appreciated that other measurements or metrics can be used within the scope of the technology described herein.

In order to determine the amount of greenhouse gas that corresponds to the carbon footprint value, the module 106a collects a set of constants that are used in subsequent calculations. In some embodiments, the module 106a retrieves one or more of the constants from database 108. In some embodiments, the module 106a issues a data request for one or more of the constants from a remote computing device (e.g., a website URL, an API feed, or other similar technologies). It should be appreciated that the following constants, and their corresponding values, are merely examples and that other types of constants and/or values can be used within the scope of invention. In one example, the constants are:

Volume of 1 lb. of pure $CO_2$ at STP=8.566 cu ft.
$CO_2$ emissions per gallon of gasoline=19.4 lbs.
Current atmospheric $CO_2$ concentration=400 ppm
$CO_2$ concentration used for carbon footprint calculations=800 ppm
Factor of pure $CO_2$ at 1,000,000 ppm=1,250
Residential electricity $CO_2$ emission rate=1.222 lbs/kWH
Residential electricity utility rate=$0.10 kWH
Gas visualization device max output level=25,000 cu. ft. per minute Next, the module 106a determines a volume in cu. ft. of gas based upon the received carbon footprint value. In order to determine a reasonable volume of $CO_2$ pollutant, the module 106a factors in the amount of pure $CO_2$ at 1,000,000 ppm. In the case of automobile emissions, for example, the carbon footprint value for an automobile—with an MPG rating of 20 MPG, a speed of 60 MPH, and a total miles driven of 40—is 38.8 lbs. of $CO_2$. The module 106a then uses the constant noted above to determine a volume of $CO_2$ gas:

Volume of $CO_2$ (cu. ft.)=Mass of $CO_2$ (lbs.)×Volume of 1 lb. of $CO_2$ at STP×Factor of pure $CO_2$, Volume of $CO_2$ (cu. ft.)=38.8 lbs.×8.566 cu. ft.×1,250=415,451 cu. ft.

Additional exemplary use cases of how the module 106a determines the volume of gas for different real-world objects and events can be found in Appendix A.

Once the module 106a determines the volume in cu. ft. that corresponds to the carbon footprint value, the module 106a generates (206) instructions for operation of the gas visualization device 110 based upon the determined volume. For example, the module 106a can retrieve operational settings or parameters for the gas visualization device 110 from database 108. These settings can comprise a volume of fog or vapor produced per second (or per minute), a port aperture setting, and the like that relate to the amount of fog or vapor produced during operation. For example, as noted above, at maximum output the gas visualization device 110 produces 25,000 cu. ft. of fog or vapor per minute of operation.

Using this maximum output value, the module 106a can determine a duration at which the gas visualization should run at maximum output to produce the equivalent volume of fog or vapor to the amount of greenhouse gas. Using the volume calculated above as an example, the module 106a determines that $$\text{Duration} = \frac{\text{Volume of CO}_2(\text{cu. ft.})}{\text{Maximum output value}},$$

$$\text{Duration} = \frac{415{,}451 \text{ cu. ft.}}{25{,}000 \text{ cu. ft. per minute}},$$

$$\text{Duration} = \sim 17 \text{ minutes}$$

Therefore, the module 106a generates instructions for the gas visualization device 110 to operate at maximum output for approximately 17 minutes, to produce an equivalent amount of fog to the amount of $CO_2$ produced by the automobile in the example above. It should be appreciated that in some embodiments, the gas visualization device 110 can be operated at lower than maximum output, e.g., by adjusting the aperture size or reducing the amount of gas emitted.

The greenhouse gas determination module 106a transmits (208) the instructions to the gas visualization device 110, and the gas visualization device 110 executes the instructions to produce the fog or vapor. For example, the gas visualization device 110 activates its motor to begin producing fog at maximum output and programs its memory according to the instructions to remain activated for approximately 17 minutes. At the conclusion of the programmed time period, the gas visualization device 110 shuts off its motor and stops producing fog. It should be appreciated that, in a preferred embodiment, the fog or vapor produced by the device 110 is visible to the naked eye, so that viewers can visually appreciate the amount of $CO_2$—a colorless, odorless gas—that is associated with everyday activities and objects. In this way, viewers truly understand the effect that participating in such activities and using such objects has on the environment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

APPENDIX A

Automobile Emissions
Automobile Mile Per Gallon Rating=20 MPG

| Speed (MPH) | Miles Per Min. | Gallons Per Min. | Lbs. $CO_2$ Per Min. | Pure $CO_2$ Cu. Ft. per Min. | $CO_2$ Cu. Ft. Per Min. at 2X Atmospheric |
|---|---|---|---|---|---|
| 60 | 1 | 0.05 | 0.97 | 8.31 | 10,386 |

Using the above values:
 In real time, the automobile produces 10,386 cu. ft. of $CO_2$ per minute.
 This equates to 42% of the maximum output value of the gas visualization device (i.e., 25,000 cu ft. per minute).
This value can then be used to determine the amount of $CO_2$ produced for some typical commute distances:

| Total Miles Driven | Mass $CO_2$ (lbs.) | Vol. $CO_2$ (cu. ft.) at 2X Atmospheric | Duration of Gas Visualization Device at Max Output (min.) |
|---|---|---|---|
| 1 | 1.0 | 10,386 | 0.4 |
| 5 | 4.9 | 51,931 | 2 |
| 10 | 9.7 | 103,863 | 4 |
| 20 | 19.4 | 207,726 | 8 |
| 30 | 29.1 | 311,588 | 12 |
| 40 | 38.8 | 415,451 | 17 |
| 50 | 48.5 | 519,314 | 21 |

Home Energy Usage
The following are some exemplary determinations of $CO_2$ production corresponding to home energy usage:

Volume $CO_2$ (cu. ft.) at 2×atmospheric=Monthly Electric Usage (kWH)×Electricity $CO_2$ emission rate (lbs./kWH)

Electricity $CO_2$ emission rate (lbs./kWH)=1.222

| Monthly Electric Usage (kWH) | Mass $CO_2$ (lbs.) | Volume $CO_2$ (cu. ft.) at 2X Atmospheric | Real-Time Cu. Ft. Per Minute | Duration of Gas Visualization Device at Max Output (min.) |
|---|---|---|---|---|
| 500 | 611 | 6,542,283 | 151 | 262 |
| 1,000 | 1,222 | 13,084,565 | 303 | 523 |
| 1,500 | 1,833 | 19,626,848 | 454 | 785 |
| 2,000 | 2,444 | 26,169,130 | 606 | 1,047 |
| 2,500 | 3,055 | 32,711,413 | 757 | 1,308 |
| 3,000 | 3,666 | 39,253,695 | 909 | 1,570 |

Equations used to determine the above values:

Volume $CO_2$ (cu. ft.) at 2×atmospheric=Monthly Electric Usage (kWH)×Electricity $CO_2$ emission rate (lbs./kWH)

Real-Time Cu. Ft. Per Minute=Volume $CO_2$ (cu. ft.) at 2×atmospheric/43,200

Duration of Gas Visualization Device at Max Output (min.)=Volume $CO_2$(cu. ft.) at 2×atmospheric/Max. Output of Device Bottled Water Production
Ounces of $CO_2$ per bottle=3
Lbs. of $CO_2$ per bottle=3/16=0.1875
Volume of pure $CO_2$ (cu. ft.) per bottle=0.1875×5.866=1.61
Volume of $CO_2$ (cu. ft.) at 2×atmospheric=1.61×1,200=2,008
Duration of gas visualization device at max output (min.) per bottle=2,008/25,000=5 seconds
Duration of gas visualization device at max output (min.) for 24 bottles=116 seconds

What is claimed is:

1. A system for visualization of a carbon footprint for one or more real-world objects or events, the system comprising:
 a server computing device; and
 a gas visualization device coupled to the server computing device;
 wherein the server computing device:
  identifies a carbon footprint value for at least one real-world object or event;
  determines an amount of greenhouse gas that corresponds to the carbon footprint value;
  generates instructions for operation of the gas visualization device based upon the amount of greenhouse gas; and
  transmits the instructions to the gas visualization device; and
 wherein the gas visualization device executes the instructions to produce an amount of gas based upon the received instructions.

2. The system of claim 1, wherein the instructions for operation of the gas visualization device comprise one or more settings for hardware components of the gas visualization device.

3. The system of claim 2, wherein the one or more settings for hardware components of the gas visualization device comprise an aperture size for a gas emission port on the gas visualization device.

4. The system of claim 2, wherein the one or more settings for hardware components of the gas visualization device comprise a gas volume output value for a pump housed in the gas visualization device.

5. The system of claim 2, wherein the one or more settings for hardware components of the gas visualization device comprise a start time and an end time for activation of a timer in the gas visualization device that controls gas output.

6. The system of claim 1, wherein identifying a carbon footprint value for at least one real-world object or event comprises:
 determining one or more data values associated with the at least one real-world object or event; and
 converting the one or more data values associated with the at least one real-world object or event into the carbon footprint value using a predetermined algorithm.

7. The system of claim 6, wherein the carbon footprint value comprises a mass of CO2.

8. The system of claim 1, wherein the amount of greenhouse gas that corresponds to the carbon footprint value is expressed as a volume of greenhouse gas.

9. The system of claim 8, wherein determining an amount of greenhouse gas that corresponds to the carbon footprint value comprises:
 identifying one or more constants associated with conversion of the carbon footprint value into the volume of greenhouse gas; and
 converting the carbon footprint value into the volume of greenhouse gas using the one or more constants.

10. The system of claim 9, wherein the one or more constants comprise a volume of one pound of pure $CO_2$ at standard temperature and pressure (STP), an amount of $CO_2$ emissions per gallon of gasoline, a current atmospheric $CO_2$ concentration, a $CO_2$ concentration used for carbon footprint calculations, a factor of pure $CO_2$ at 1,000,000 parts per minute (ppm), a residential electricity $CO_2$ emission rate, a residential electricity utility rate, and a gas visualization device max output level.

11. A computerized method of visualization of a carbon footprint for one or more real-world objects or events, the method comprising:
 identifying, by a server computing device, a carbon footprint value for at least one real-world object or event;
 determining, by the server computing device, an amount of greenhouse gas that corresponds to the carbon footprint value;
 generating, by the server computing device, instructions for operation of a gas visualization device, coupled to the server computing device, based upon the amount of greenhouse gas;
 transmitting, by the server computing device, the instructions to the gas visualization device; and
 executing, by the gas visualization device, the instructions to produce an amount of gas based upon the received instructions.

12. The method of claim 11, wherein the instructions for operation of the gas visualization device comprise one or more settings for hardware components of the gas visualization device.

13. The method of claim 12, wherein the one or more settings for hardware components of the gas visualization device comprise an aperture size for a gas emission port on the gas visualization device.

14. The method of claim 12, wherein the one or more settings for hardware components of the gas visualization device comprise a gas volume output value for a pump housed in the gas visualization device.

15. The method of claim 12, wherein the one or more settings for hardware components of the gas visualization device comprise a start time and an end time for activation of a timer in the gas visualization device that controls gas output.

16. The method of claim 11, wherein identifying a carbon footprint value for at least one real-world object or event comprises:
 determining one or more data values associated with the at least one real-world object or event; and
 converting the one or more data values associated with the at least one real-world object or event into the carbon footprint value using a predetermined algorithm.

17. The method of claim 16, wherein the carbon footprint value comprises a mass of CO2.

18. The method of claim 17, wherein the amount of greenhouse gas that corresponds to the carbon footprint value is expressed as a volume of greenhouse gas.

19. The method of claim 18, wherein determining an amount of greenhouse gas that corresponds to the carbon footprint value comprises:
 identifying one or more constants associated with conversion of the carbon footprint value into the volume of greenhouse gas; and
 converting the carbon footprint value into the volume of greenhouse gas using the one or more constants.

20. The method of claim 19, wherein the one or more constants comprise a volume of one pound of pure $CO_2$ at standard temperature and pressure (STP), an amount of $CO_2$ emissions per gallon of gasoline, a current atmospheric $CO_2$ concentration, a $CO_2$ concentration used for carbon footprint calculations, a factor of pure $CO_2$ at 1,000,000 parts per minute (ppm), a residential electricity $CO_2$ emission rate, a residential electricity utility rate, and a gas visualization device max output level.

* * * * *